US008686959B2

(12) United States Patent
Payne

(10) Patent No.: US 8,686,959 B2
(45) Date of Patent: Apr. 1, 2014

(54) TOUCH SCREEN MULTI-CONTROL EMULATOR

(76) Inventor: Maurice Payne, Las Vegas, NV (US)

( * ) Notice: Subject to any disclaimer, the term of this patent is extended or adjusted under 35 U.S.C. 154(b) by 358 days.

(21) Appl. No.: 13/029,058

(22) Filed: Feb. 16, 2011

(65) Prior Publication Data

US 2011/0199325 A1     Aug. 18, 2011

Related U.S. Application Data

(60) Provisional application No. 61/304,801, filed on Feb. 16, 2010.

(51) Int. Cl.
*G06F 3/041*     (2006.01)
(52) U.S. Cl.
USPC ............... 345/173; 345/161; 463/36; 463/47
(58) Field of Classification Search
CPC . A63F 13/02; A63F 2300/1075; G06F 3/041; G06F 3/0338
USPC ............................ 345/161–179; 463/36–47
See application file for complete search history.

(56) References Cited

U.S. PATENT DOCUMENTS

| 8,368,662 | B2 * | 2/2013 | Argiro | 345/173 |
|---|---|---|---|---|
| 2008/0238879 | A1 * | 10/2008 | Jaeger et al. | 345/173 |
| 2009/0244022 | A1 * | 10/2009 | Masuda et al. | 345/173 |
| 2009/0284487 | A1 * | 11/2009 | Nakanishi et al. | 345/173 |
| 2009/0316380 | A1 * | 12/2009 | Armstrong | 361/829 |
| 2010/0048271 | A1 * | 2/2010 | Champagne et al. | 463/6 |
| 2010/0057273 | A1 * | 3/2010 | Heers et al. | 701/1 |
| 2010/0081505 | A1 | 4/2010 | Alten | |
| 2010/0090974 | A1 * | 4/2010 | Jung et al. | 345/173 |
| 2010/0110013 | A1 * | 5/2010 | Li et al. | 345/169 |
| 2010/0247223 | A1 * | 9/2010 | Ribi | 401/195 |
| 2010/0253635 | A1 * | 10/2010 | Chen | 345/173 |
| 2010/0277415 | A1 * | 11/2010 | Shanmugam et al. | 345/169 |
| 2010/0277428 | A1 * | 11/2010 | Kumazawa | 345/173 |

OTHER PUBLICATIONS

Wikipedia, Metriod Prime Hunters: Game Play: Single-Player, website, http://en.wikipedia.org/wiki/Metroid_Prime_Hunters#Single-player.
22Moo, GameBone, website, http://www.22moo.com.au/GameBone.html.
Marware, Game Grip, website, http://www.marware.com/products/Game-Grip_2.
Gamevil, Games: Zenonia, website, http://us.gamevil.com/games.php?m=AppStoreDetail&gid=5.
Google Groups, website, http://groups.google.com/group/cocos2d-iphone-discuss/browse_thread/thread/7b34fc0d215f68bf?pli=1.
Giant Bomb, Virtual Joystick, website, http://www.giantbomb.com/virtual-joystick/92-4951/.
Wikipedia, Touchscreen: Technologies: Capacitive.
Tracy V. Wilson, How the iPhone Works: iPhone Touch Screen, website, http://electronics.howstuffworks.com/iphone1.htm.

* cited by examiner

*Primary Examiner* — Amare Mengistu
*Assistant Examiner* — Vinh Lam
(74) *Attorney, Agent, or Firm* — Alexander Chen, Esq.

(57) ABSTRACT

An input emulation apparatus for any touch screen device with an input device having a receptive component for a user's hand and/or finger inputs and a contact component for contacting the touch screen device, where the contact component is operatively linked to the input component so that the contact device contacts the touch screen device as it responds to the user's hand input.

12 Claims, 16 Drawing Sheets

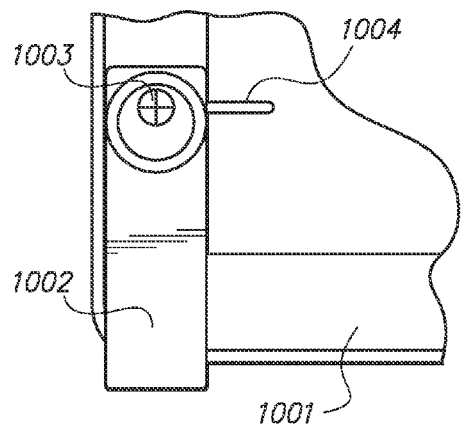
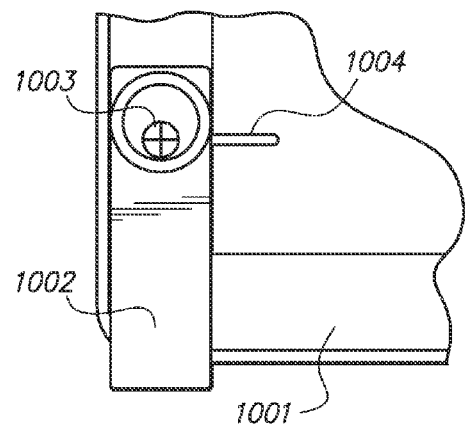
FIG. 10A    FIG. 10B
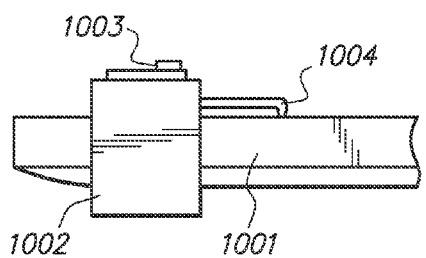
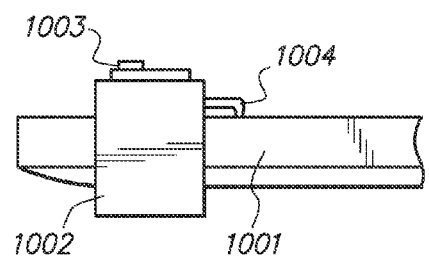
FIG. 10C    FIG. 10D

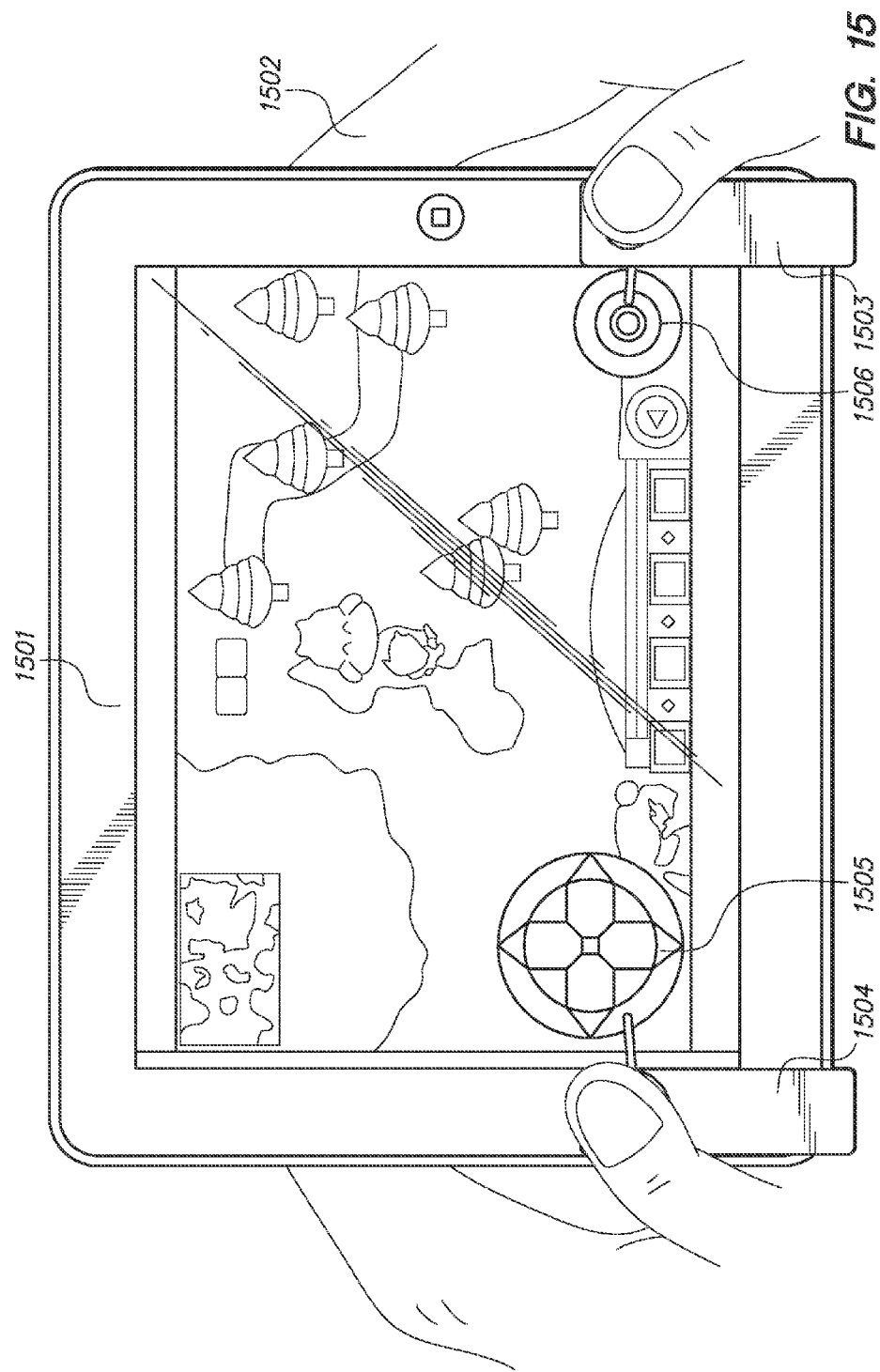

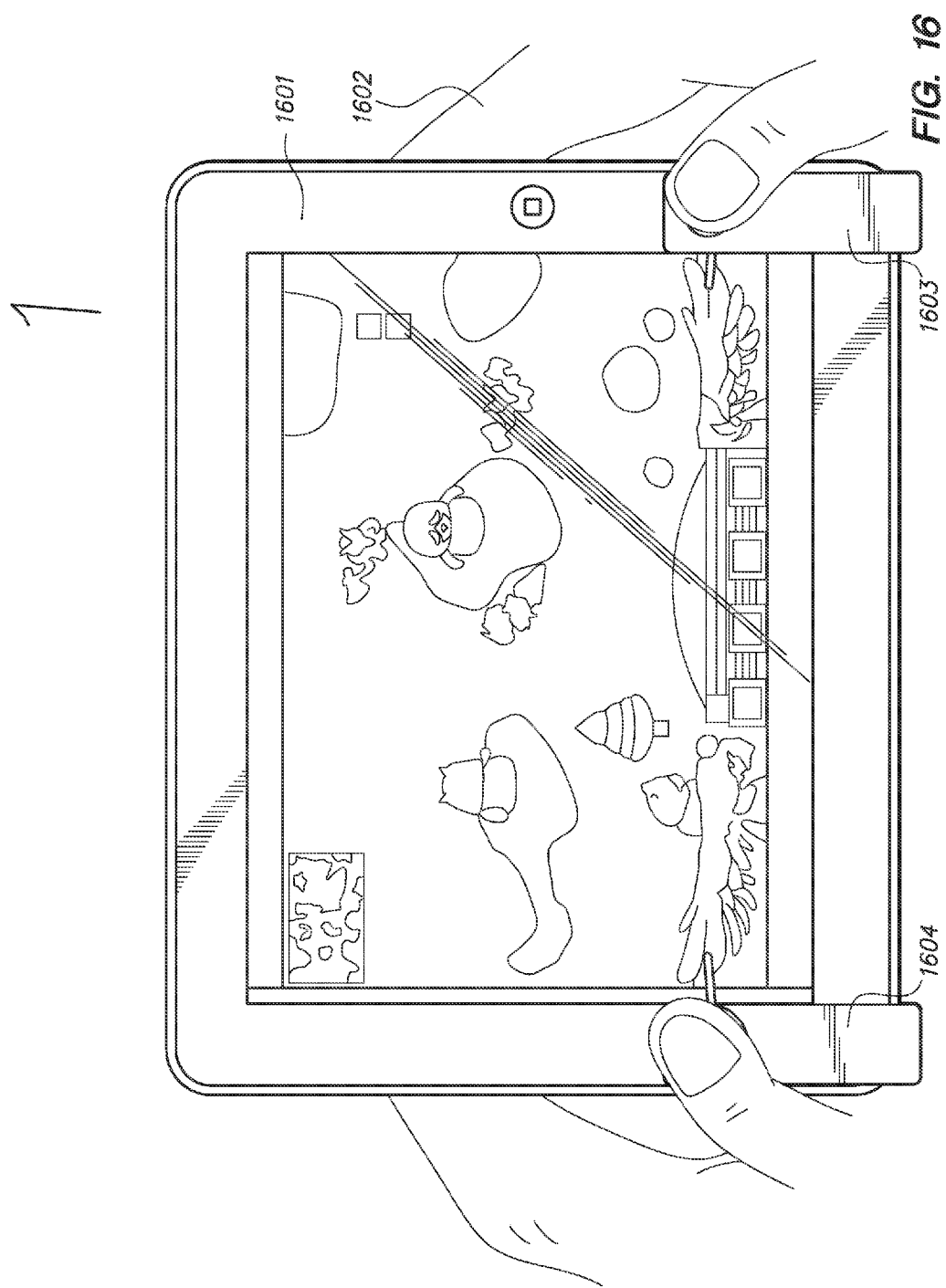

TOUCH SCREEN MULTI-CONTROL EMULATOR

CROSS-REFERENCE TO RELATED APPLICATION

This application claims the benefit of priority tinder 35 U.S.C. 119(e) to the filing date of U.S. provisional patent application No. 61/304,801 entitled "Touch Screen Multi-Control Emulator" which was filed Feb. 16, 2010 and is incorporated herein by reference.

FIELD OF THE INVENTION

The subject invention is a device that controls a touch screen device via finger manipulations of the off-screen joystick and buttons. These off-screen controls are able to more efficiently control the touch screen, thereby making touch screen devices more user friendly.

BACKGROUND OF THE INVENTION

By way of background, touch screen is becoming important in today's electronic age and is quickly becoming the primary way for users to interact with computers and smart phones. The success of Apple iPad, iPhone, Google Android and Samsung Galaxy devices underlines the general industry trend. A touch screen is an electronic visual display that can detect the presence and location of a touch within the display area. The term generally refers to touch or contact to the display of the device by a finger or hand. Touch screens can also sense, other passive objects, such as a pen. However, if the object sensed is active, as with a light pen, the term touch screen is generally not applicable. The ability to interact physically with what is shown on a display (a form of "direct manipulation") typically indicates the presence of a touch screen.

The touch screen has two main attributes. First, it enables one to interact with what is displayed directly on the screen, where it is displayed, rather than indirectly with a mouse or touchpad. Secondly, it lets one do so without requiring any intermediate device, again, such as a stylus that needs to be held in the hand. Such displays can be attached to computers or, as terminals, to networks. They also play a prominent role in the design of digital appliances such as the personal digital assistant ("PDA"), satellite navigation devices, mobile phones, and video games.

Currently touch screens utilize the following technology: A resistive touch screen panel is composed of several layers where the most important of which are two thin, metallic, electrically conductive layers separated by a narrow gap. When a finger presses down on a point on the panel's outer surface, the two metallic layers become connected at that point and the panel then behaves as a pair of voltage dividers with connected outputs. As a result, this causes a change in the electrical current which is registered as a touch event and sent to the controller for processing.

A capacitive touch screen panel consists of an insulator such as glass, coated with a transparent conductor such as indium tin oxide. Because the human body is also a conductor, touching the surface of the screen results in a distortion of the body's electrostatic field which in term is measurable as a change in capacitance. Currently there are different technologies that may be used to determine the location of the touch. The location then can be passed to a computer running a software application, which will calculate how the user's touch relates to the computer software. In surface capacitance technology, only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel. As it has no moving parts, it is moderately durable but has limited resolution, is prone to false signals from parasitic capacitive coupling, and needs calibration during manufacture. This is most often used in simple applications such as industrial controls and kiosks.

Another technology is Projected Capacitive Touch technology or the PCT technology. It is basically a capacitive technology that permits more accurate and flexible operation, by etching the conductive layer. Here, an XY array is formed either by etching a single layer to form a grid pattern of electrodes, or by etching two separate, perpendicular layers of conductive material with parallel lines or tracks to form the grid. When applying voltage to the array, it creates a grid of capacitors. Bringing a finger or conductive stylus close to the surface of the sensor changes the local electrostatic field. The capacitance change at every individual point on the grid can be measured to accurately determine the touch location. The use of a grid permits a higher resolution than resistive technology and also allows multi-touch operation. Examples of consumer devices using projected capacitive touchscreens includes Apple Inc.'s iPhone and iPod Touch. Other technologies include optical imaging technology, dispersive signal technology, and acoustic pulse recognition.

Even though touch screen devices are more popular than ever, inputs for touch screens have been problematic. Touch screen devices generally lack common input devices found on home consoles/computers. The analog control and buttons found on game controls are two commons inputs not found on many touch screen devices.

Current touch screen devices have the following options when it comes to these kinds of controls for input. The first type includes controls that are build directly into the device. (Example: Blackberry devices with attached physical keyboard and control ball.) Said controls make the device unnecessarily large, thereby making the device more expensive/unable to replace if controls break. In addition, these built in controls may be very small and hard to operate. They also consume power to operate, thereby reducing battery life of the main device. The second type is a plug-in device. One example of such device would be an external attached "flip open" keyboard. The problem associated with this type of solution is that it makes the device unnecessarily large due to the necessary inputs such as USB cable connectors and/or bluetooth transmission technologies, which consume more power to operate. It is also much more expensive to produce since it contains numerous electronic parts. The third type of controls are capable of virtual input to the touch screen device. Examples of such controls are the virtual keyboard found on many of the smart phone devices in the market today. The primary flaw with this technology is that it takes up valuable touch screen real estate. It is also very difficult for the user to apply control since the inputs are purely virtual and thus, there is no physical component to touch. Said technology is usually small and harder to operate easily and effectively. As a result of the aforementioned, the market now demands an efficient user friendly physical control that can easily integrate with a variety of virtual controls, thereby making the user's experience more efficient and accurate.

Valuable screen space on the touch screen devices is maximized when the subject invention is utilized via minimizing any on-screen controls.

OBJECT OF THE INVENTION

The primary objective of the present invention is to replace inefficient on-screen virtual controls on touch screen devices with a user-friendly off-screen control that makes the user's experience more efficient and quicker while at the same time maximizing screen space on the touch screen device.

Another objective of this invention is to produce sleek, aesthetically-pleasing, durable, and comfortable controls for touch screen devices, which are removable, do not damage the touch screen's surface, and require no power to operate.

Another objective of this invention is to provide a touch screen device user with external peripheral that is not built into the touch screen device and may be utilized with many such touch screen devices. As the control is removable, it is portable from device-to-device.

Another objective of this invention is to provide a peripheral that does not need to be powered by electricity. Since the peripherals do not require electronic power to operate, they will not require the use of bulky batteries or USB/power cords. Additionally, said peripherals can be made economically and attached to a variety of touch screen devices.

Another objective of this invention is to enhance the touch screen device user's experience by making his/her control of an application, such as a game, quicker, more efficient, and more accurate than existing virtual controls on the devices themselves.

To accomplish the above objectives, this invention may be embodied in the form illustrated in the accompanying drawings/figures, attention being called to the fact, however, that the drawings/figures are illustrative only and that changes may be made in the specific construction illustrated and described within the scope of the appended claims.

SUMMARY OF THE INVENTION

In one embodiment, of the subject invention, a peripheral input emulation apparatus for a touch screen device is comprised (1), an input device that acts as a receptive component for the user's hand and/or finger inputs and (2) a contact component which links the input component to the touch screen device such that the contact component communicates with the touch screen device by responding to the user's hand and/or fingers. It is important to note that for the purpose of interpretation in this application, the term hand shall include the use of fingers.

Specifically, the contact component may communicate with the touch screen device via directly touching the screen and/or communicating without actual physical touch of the screen. For instance, on a pressure sensitive touch screen the contact component would have to physically touch the screen. For a capacitive touch screen the contact component could touch the screen or be made of material like a magnet that just needs to be hovering close enough to the touch screen to activate the desired touch screen response.

In another embodiment, the peripheral control is comprised of a body that secures the control to the touch screen via a U-shaped body that latches onto the touch screen device itself. In another embodiment, the body is a sideway U-shaped body. In another embodiment, the peripheral control device is secured via suction cups to the touch screen device.

In another embodiment, peripheral control is compromised of a button and/or a joystick and/or a directional pad that is secured to the touch screen device in a variety of ways, a few of which are illustrated in the figures. In another embodiment, the input component is comprised of a pin. In another embodiment, the pin is made with materials selected from a group consisting of metal, plastic, and/or rubber.

In another embodiment the receptive component and the contact component and the linkage are made of conductive materials, such as copper, silver, aluminum, graphite, and conductive polymers, in another embodiment, the contact component is comprised of electrical charge generating materials, such as a magnet. The above use of materials allows the present invention to work with touch screens employing surface capacitance technology; capacitive touch screen technology, and projected capacitive touch technology.

In another aspect of the invention, a method is disclosed for input emulation for touch screen device comprised: using a input emulation for touch screen device to input commands to the touch screen device wherein the input emulation for touch screen device is comprised of an input device comprising a receptive component for user's hand and/or finger inputs and a contact component for contacting the touch screen device wherein the contact component is operatively linked to the input component such that the contact device contacts the touch screen device responding to the user's hand and/or finger inputs to the input device, an attachment device capable of attaching the input emulation apparatus to the touch screen.

BRIEF DESCRIPTION OF THE DRAWINGS

In FIG. 10 A-D display the touch screen device having the emulator in various positions;

FIG. 15 shows a custom Touch Screen Game Control Emulator created specifically for a game;

FIG. 16 shows how a user uses the Touch Screen Game Control Emulator.

DETAILED DESCRIPTION OF THE EMBODIMENTS

The Touch-Screen Multi-Control Emulator consists of peripherals that can be attached to any touch screen device that uses the touch screen's inherent ability to duplicate/emulate input controls.

EXAMPLES

Figure 1:
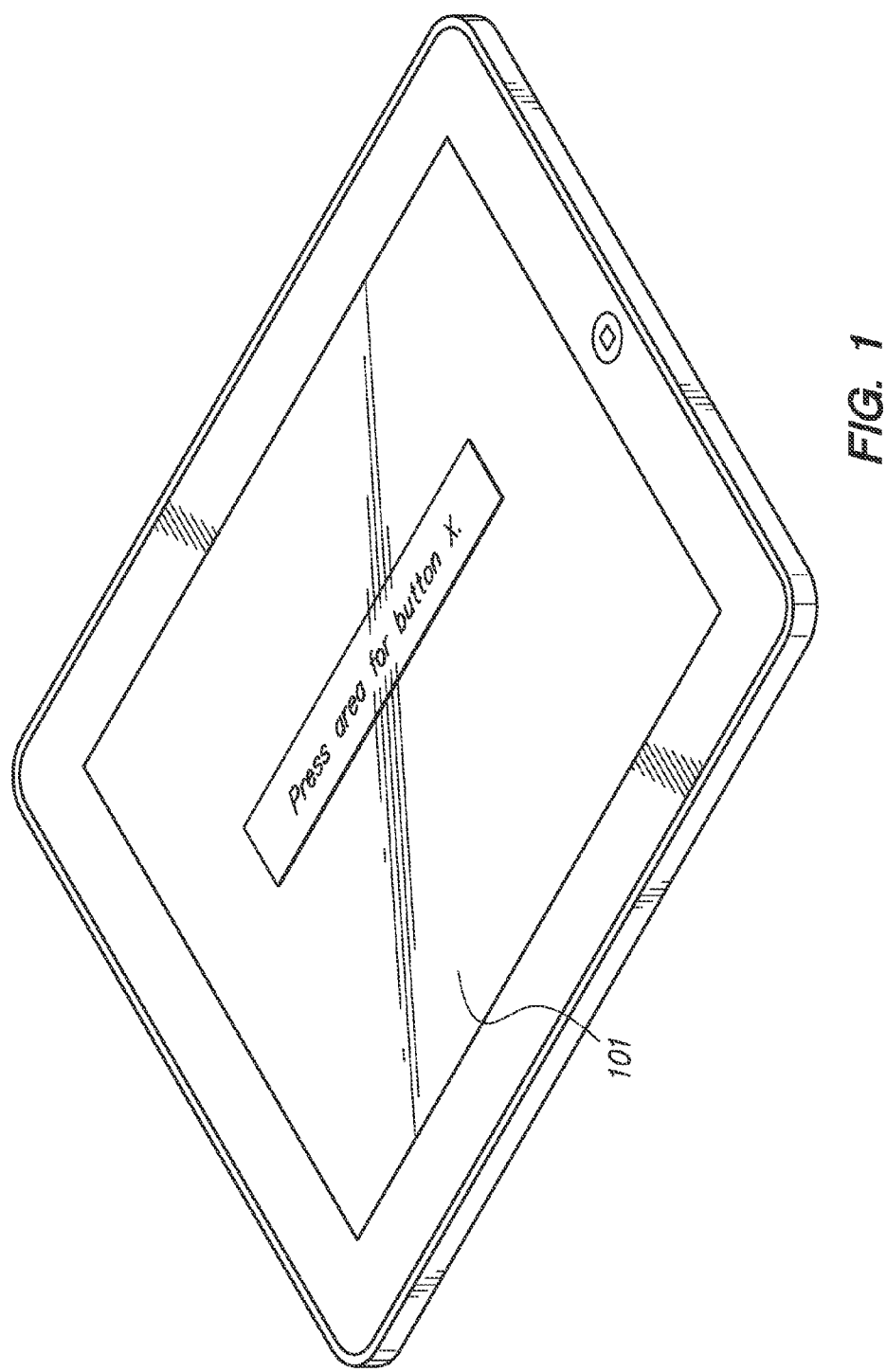
FIG. 1 shows a standard touch screen device.

Referring to FIG. 1, it shows a standard touch screen device 101 which is similar to the likes of the Apple iPad.

Figure 2A:
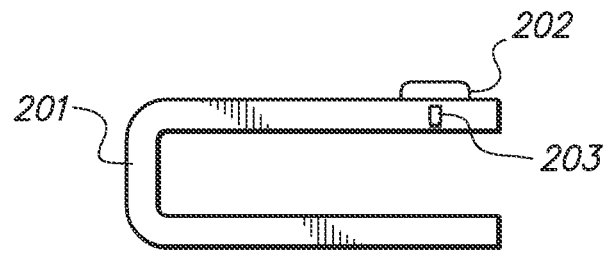
FIG. 2A-C show an embodiment of the emulator apparatus.
Figure 2B:
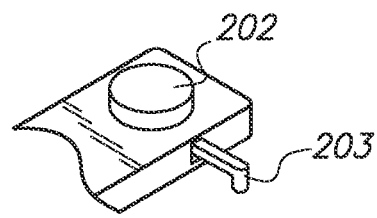
Figure 2C:
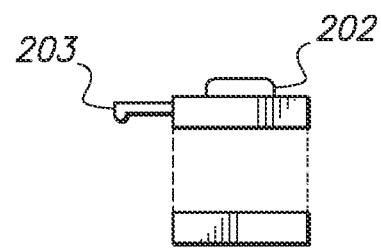

FIG. 2A-C show an embodiment of a current invention. This emulator apparatus has a primary function for button X. Specifically, FIG. 2A depicts a side view of the emulator apparatus with button 201 comprising an arch design to hold apparatus 201 to the touch screen device. It further is comprised of a button 202, which a user uses to push, and arm 203 where when the button 202 is pushed it will push the arm 203 down. The tip of the arm can be made with magnet. Similarly, the button 202, the arm 203, and the linkage between the two can all be made with conductive materials comprising copper, silver, aluminum, graphite, and conductive polymers. The above use of materials allows the present invention to work with touch screens by employing surface capacitance technology, capacitive touch screen technology, and projected capacitive touch technology.

FIG. 2B depicts the same apparatus 201 in a perspective view specifically zoomed to the area of the device incorporating the button 202 and arm 203. Here, one can see an embodiment of the specific structure of an arm 203 incorporating a pin-like structure designed to touch the screen of a touch screen device. FIG. 2C is another view of the button emulator 201 from the frontal view, which is specifically zoomed into the section incorporating the button 202 and the arm 203.

Figure 3:
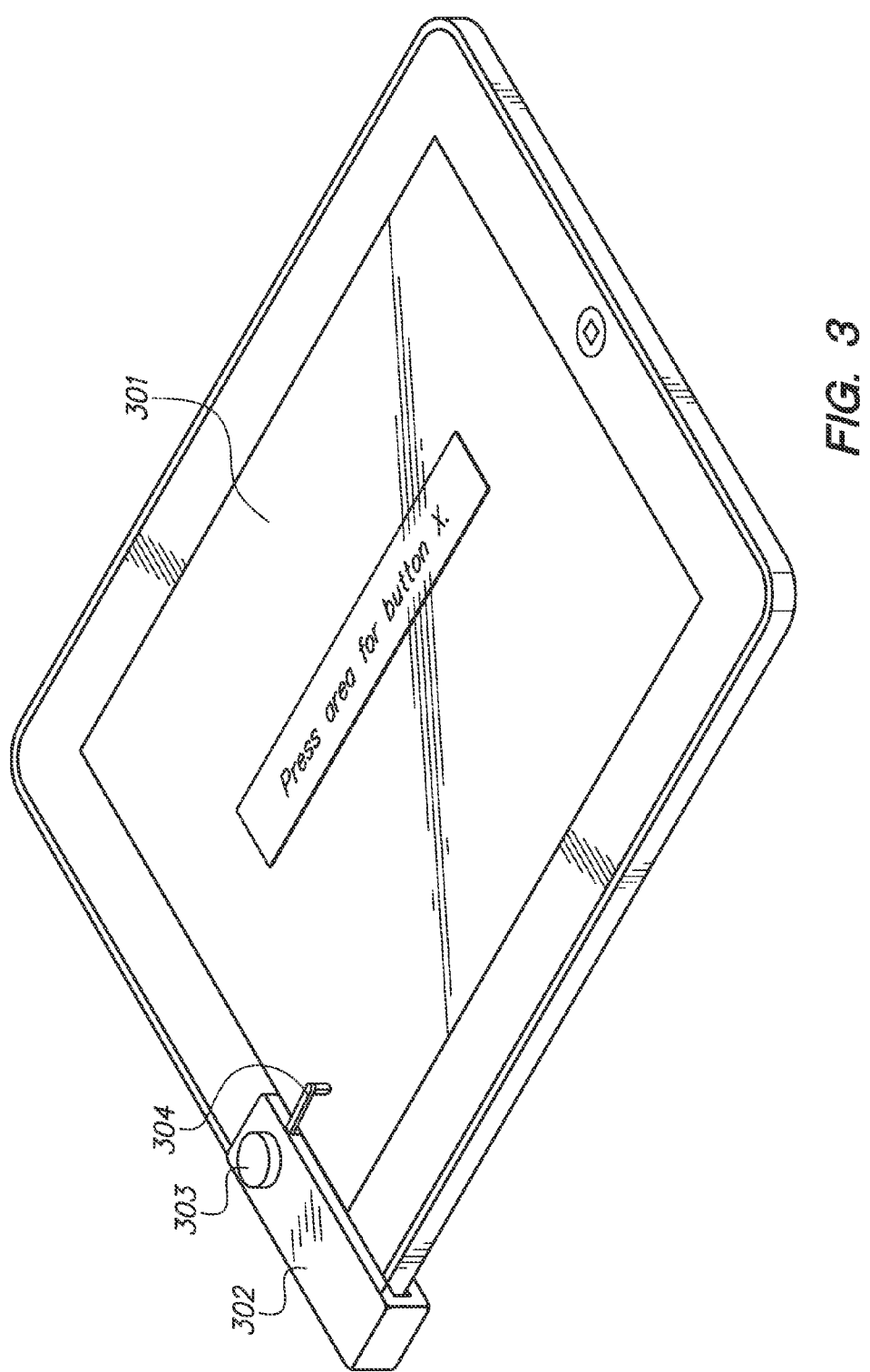
FIG. 3. shows one example (for illustrative purposes only) of how an emulator is attached to the touch screen device.
Figure 4A:
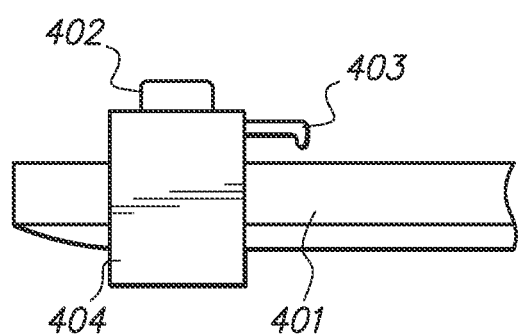
FIG. 4A shows how an emulator is attached to the touch screen device.

Now referring to FIG. 3. In one embodiment, it depicts a touch screen device 301 where now the button emulator 302 is attached to the touch screen device 301. The button emulator 302 also incorporates a button 303 and an arm 304. Now referring to FIG. 4A where the attachment of button emulator 404 is attached to the touch screen device 401 where the button emulator 404 also contains a button 402 and an arm 403. Specifically, the figure discloses the arm 403 in a position of not touching the touch screen device 401.

Figure 4B:
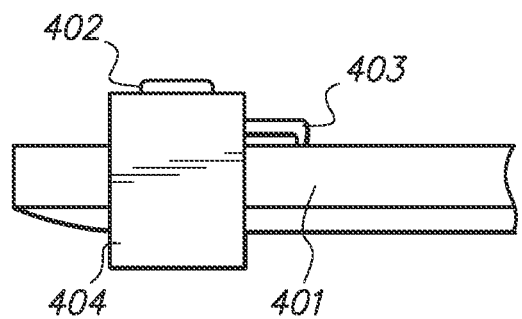
FIG. 4B shows how an emulator is contiguous with the touch screen device.

In FIG. 4B, in one embodiment, the same button emulator 404 now incorporates button 402 and arm 403 where now the arm 403 is contiguous with the touch screen device 401, in this embodiment, the arm 403 is contiguous to the touch screen device 401 as a result of the user pushing the button 402.

Figure 5:
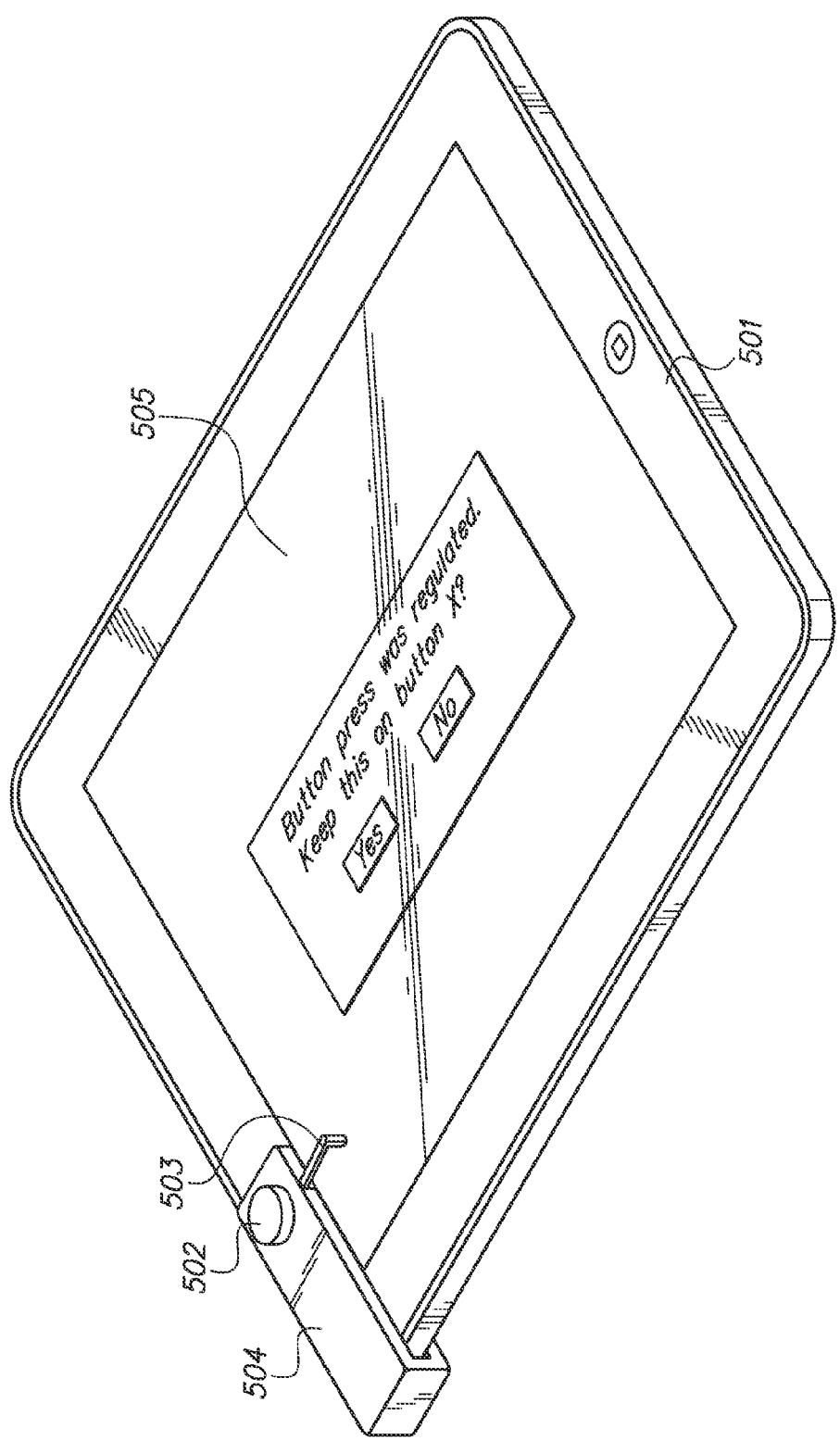
FIG. 5 shows how the touch screen device displays a prompt on its screen to begin emulation control.

In FIG. 5, in one embodiment, the touch screen device 501 displays a prompt 505 on its screen where once the arm 503 is in contiguous with touch screen device 501, the touch screen device 501 asks if the position to which the arm 403 touched on the touch screen device 501 signifies button X.

Figure 6A:
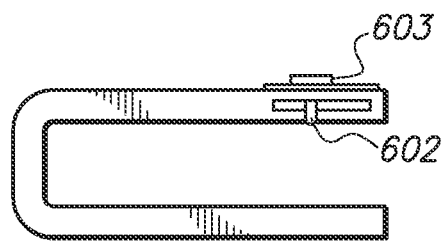
FIG. 6A shows another embodiment of an emulator.
Figure 6B:
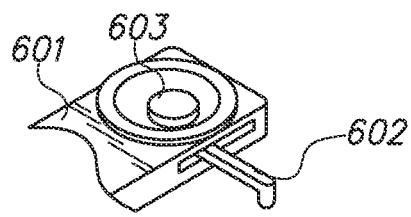
FIG. 6B shows another embodiment of an emulator.
Figure 6C:
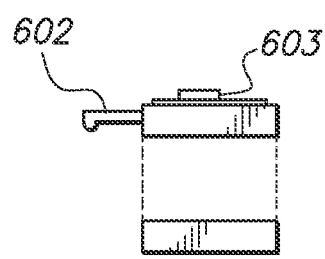
FIG. 6C shows another embodiment of an emulator.

In FIG. 6A, in one embodiment, the figure discloses a direction control emulator 601 having a direction pad 603 and an arm 602 connected to the direction pad 603. Now referring to FIG. 6B. The figure specifically zooms into the directional pad 603 showing a pad 603 that is movable in 360 degree direction within the directional pad emulator 601 wherein the arm 602 is connected to the directional pad 603 and the arm 603 moves corresponding to the movement of directional pad 603. Now referring to FIG. 6C. The direction pad emulator 601 is displayed in its frontal view, which also incorporates a direction pad 603 and arm 602. The tip of the arm 602 can be made with magnet. Since magnet carries a certain electrical charge, it will change the local electrostatic field on the touch screen panel by using every human's natural conductivity. Similarly, the directional pad 603, the arm 602, and the linkage between the two can all be made with conductive materials comprising copper, silver, aluminum, graphite, and conductive polymers. The above use of materials allows the present invention to work with touch screens, which employ surface capacitance technology, capacitive touch screen technology, and projected capacitive touch technology.

Figure 7:
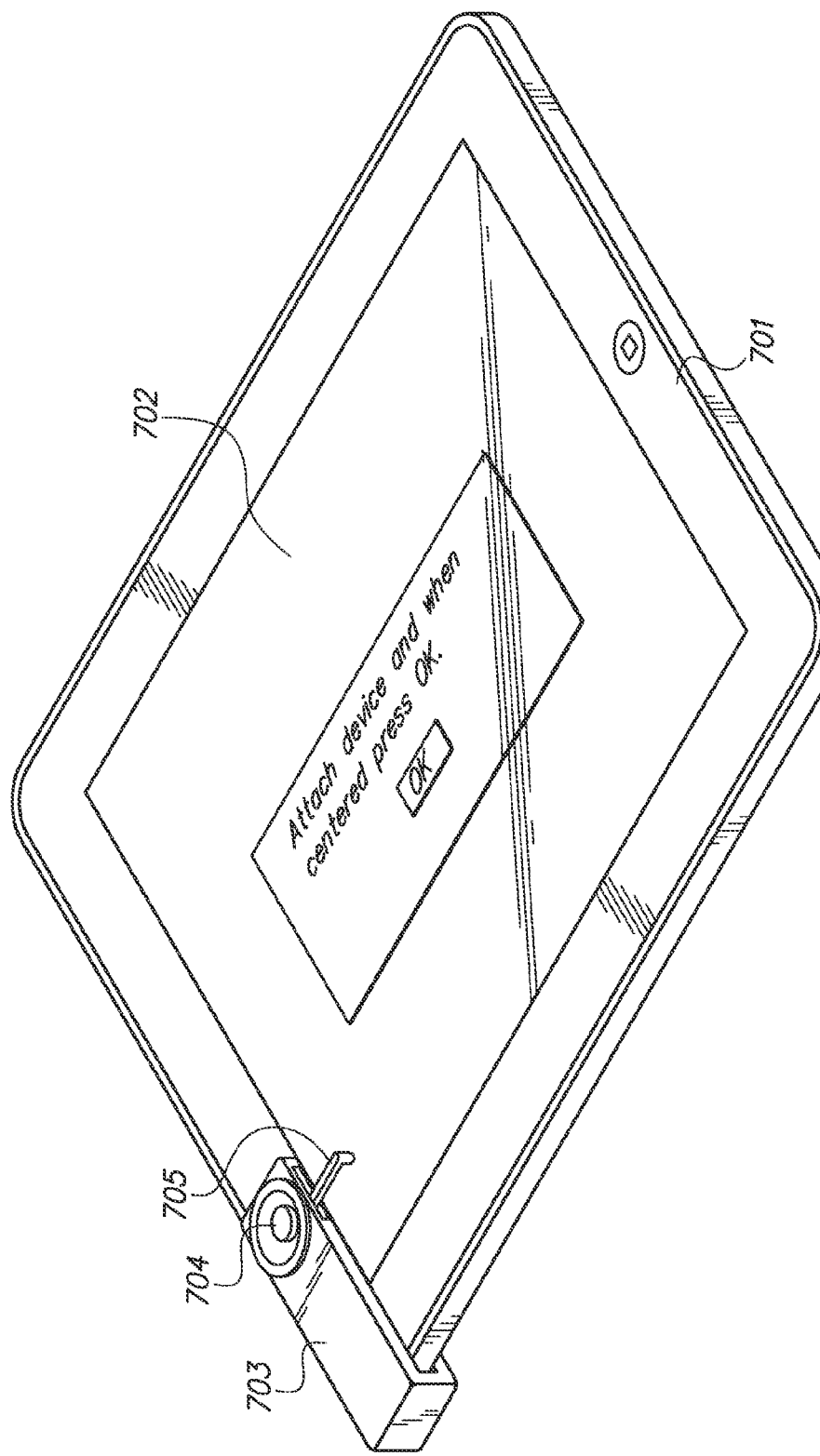
FIG. 7 shows a touch screen device having an emulator attached the to a touch screen device.
Figure 8:
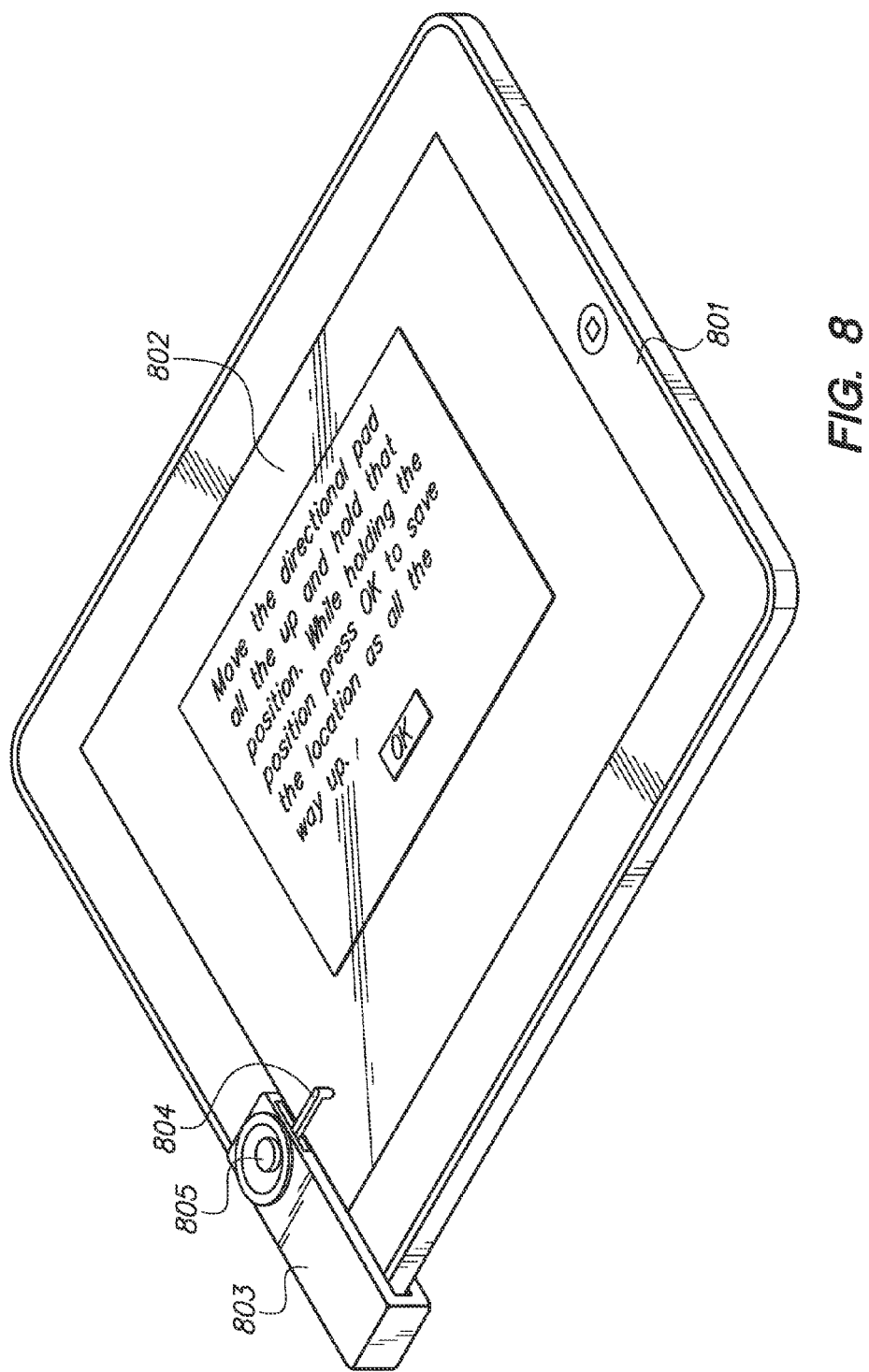
FIG. 8. how a touch screen device displays a prompt on its screen for emulation control.

Now referring to FIG. 7. In one embodiment, the figure discloses a touch screen device 701 where the direction pad emulator 703 is attached the to touch screen device 701. Here the touch screen device 701 is displaying a prompt 702 where it is asking the user to attach the directional pad emulator 703 and center the directional pad 704 having contiguous to the device 701 and then press ok on the prompt 702. In doing so, the software recognizes the center point of the directional pad on the screen of the touch screen device 701. Now referring to FIG. 8, in one embodiment, After the action taken as to referring to FIG. 7, touch screen device 801 next displays a prompt 802 asking user to move the direction pad 805 in all direction wherein the arm 804 will be in contiguous to the screen of touch screen device 801 and the software recognizes the movement range of the arm 803 on the display and correspond its range and movement for directional control.

Figure 9:
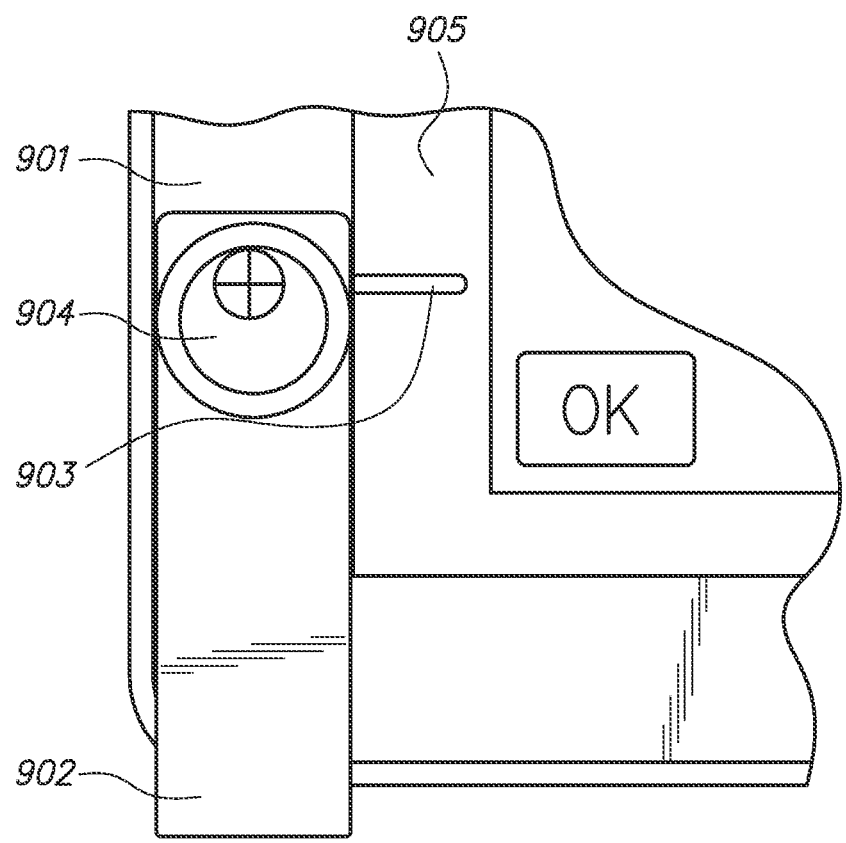
FIG. 9 shows an emulator being attached to a touch screen device.

Next, in one embodiment, FIG. 9 discloses a close up look at the directional emulator 902 being attached to touch screen device 901 having directional pad 904 and its arm 903.

In FIG. 10 A, in one embodiment, the figure displays the touch screen device 1001 from the top having the directional pad emulator 1002 attached to the device 1001 wherein the directional pad 1003 is in the up position and the arm 1004 is also in the up position FIG. 10B, the figure discloses the arm 1004 is in the lower position. Next in FIG. 10C, the figure depicts a side view wherein the arm 1004 is extended to its fullest right position. Likewise, in FIG. 10D, the figure depicts a side view wherein the arm 1004 is extended to its left furthest position on the device 1001.

Next, in one embodiment, the following steps will show how the Touch Screen Game Control Emulator could be integrated in a real world application. This is just one example of how it could work and is provided for illustrative purposes only, in one embodiment, the present invention may contain an ongoing open source component allowing for the adoption of the Touch Screen Game Control Emulator peripheral in different configurations. In another embodiment, any programmer that wants to use the Touch Screen Game Control Emulator is free to create their own software/program if they do not want to use the open source code.

Obviously, this software component would not be needed if a specific Touch Screen Game Control Emulator peripheral was made for a specific touch screen device and program. In that case, the peripheral would simply map directly and exactly to what the user would touch with their fingers in the first place.

It should be noted that every touch screen device already has built-in functions wherein programs can access for interactions. The major ones that will be used in the process below are the functions that allow a program to know what area on the touch screen the user activated (in the case of a button press) or is activating (in the case of a drag from point a to point b). In one embodiment, below provides highlights as to how the Touch Screen Game Control Emulator peripheral, software and touch screen device would interact together.

Example 1

The steps here illustrate how a software can interact with respect to button emulator:

| Process | Illustration | Pseudocode |
| --- | --- | --- |
| Program prompts user to attach device and press area that will be used for button x. | Refer to FIG. 1, 2A, 2B, 2C and 3 | Program calls function: Prompt('Press area for button x.') |
| User presses the button causing the button arm to lower enough to activate the touch screen area below the interacting tip of the arm. | Refer to FIG. 4A, 4B | Touch screen device sends X, Y coordinates to program. |
| Program confirms to the user that an area was pressed and will be used for button x. | Refer to FIG. 5 | Program calls function: Confirm('Button press was registered. Keep this as button x?') |
| User presses 'Yes' or 'No' of the confirm process. Pressing 'No' will restart the process from the Prompt function. Pressing 'Yes' will save the area as button x and continue the program. | | Program intercepts user input: If No go to Prompt( ) step Else save X, Y coordinates as button x and continue |
| Going forward whenever the user presses the button, causing the arm to lower and activate the previously confirmed position of button x, the program will interpret that as a button x press and take action accordingly. | | Touch screen device sends X, Y coordinates to program. Program calls function: Button = LookupButton (X, Y, 3) If Button is not 'empty' do whatever the button is suppose to do Else do nothing since it is not a button |

Example 2

Here, the steps illustrate haw a software can interact with respect to a directional pad emulator:

| Process | Illustration | Pseudocode |
| --- | --- | --- |
| Program prompts user to attach device and press 'OK' when the device has been attached and is centered. | Refer to FIG. 6A, 6B, 6C and 7 | Program calls function: ConfirmArea('Attach device and when centered press OK.') Touch screen device sends most currently activated X, Y coordinate (and potentially still active since the directional pad's arm could be continuously activating the touch screen) to program. Program intercepts user input: Save X, Y coordinates as center of directional pad and continue. |
| Program prompts user to move directional pad all the way UP and hold it. Then press 'OK' to store that position as all the way UP. | Refer to FIG. 8 and 9 | Program calls function: ConfirmArea('Move the directional pad all the way UP and hold that position. While holding the position press OK to save the location as all the way UP.') Touch screen device sends most currently activated X, Y coordinate (and potentially still active since the directional pad's arm could be continuously activating the touch screen) to program. Program intercepts user input: Save X, Y coordinates as all the way UP of directional pad and continue. |

| | | |
|---|---|---|
| Repeat previous step for DOWN, LEFT and RIGHT. | Refer to FIG. 10A, 10B, 10C and 10D | N/A |
| Going forward whenever the user moves the directional pad causing the arm to activate the previously confirmed position of a direction, the program will interpret that as a directional input and take action accordingly. | | Touch screen device sends X, Y coordinates to program. (Multiple times since it is a dragging or sliding action.) Program calls function: Direction = LookupDirection (X, Y) If Direction is not 'empty' do whatever the direction is suppose to do Else do nothing since it is not a direction |
| Since we now have CENTER, all the way UP/DOWN/LEFT/RIGHT. We can use these coordinates to create a wide range of directional inputs if we wanted to. Such as slightly UP or diagonal DOWN and to the LEFT. | | |

Example 3

In one embodiment, the following illustrates how the emulator apparatus actually works in a gaining environment on a touch screen device.

Figure 11:
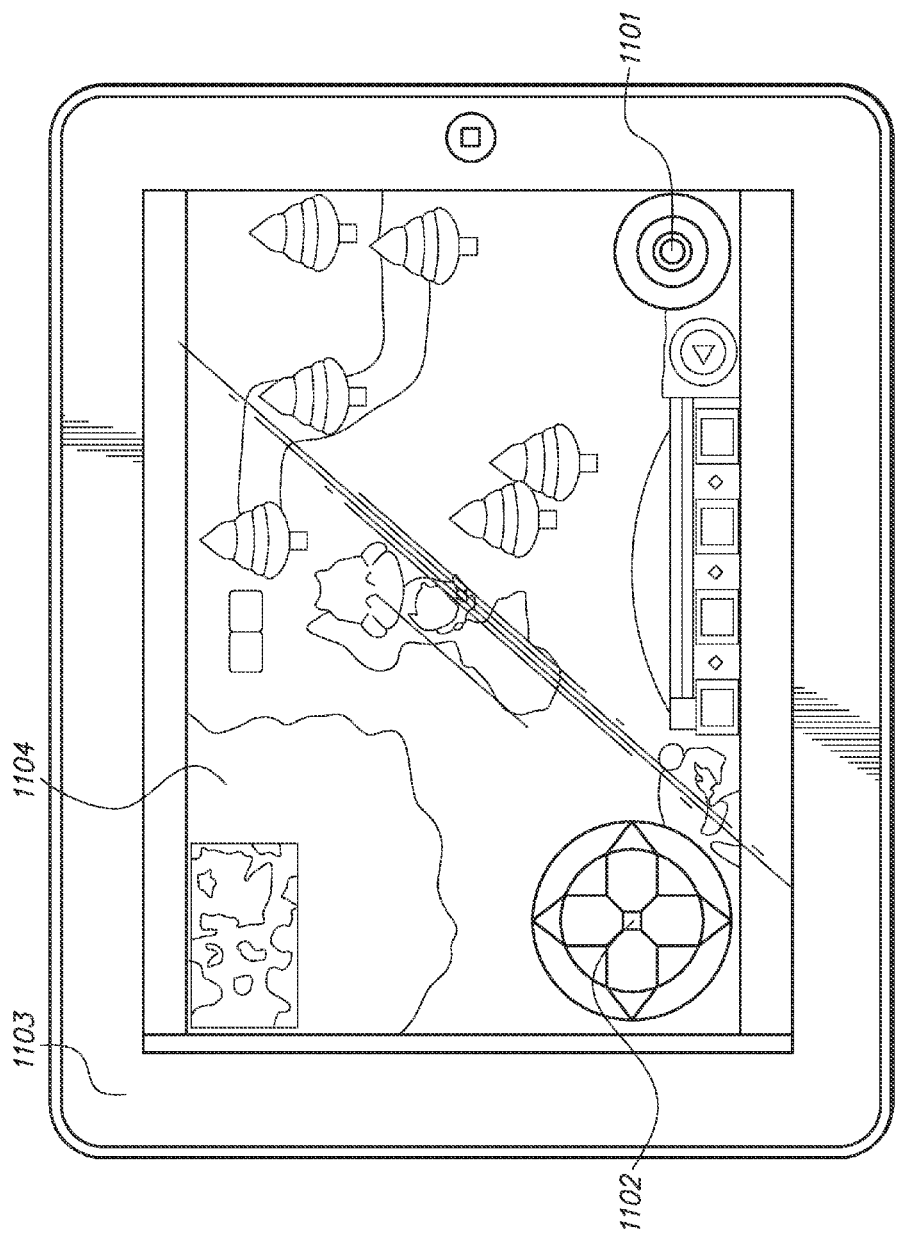
FIG. 11 shows how a game on a touch screen device would look and would be played typically.

In FIG. 11, the figure shows how the game looks and would be played today. The image shows the virtual controls, directional pad 1102, and button x 1101 currently used to play the game. Said virtual controls are virtual because they are not physical controls. Instead they are an image of a control directly displayed on the touch screen's surface. This is the only option when it comes to controlling your character. Specifically, there is a virtual directional pad 1102 located in the bottom left. A user would have to physically touch the up, down, left and right virtual areas of the virtual directional pad 1102 to move the character on the screen. There is a virtual 'attack' button 1101 located in bottom right corner. A user would have to physically touch the virtual 'attack' button 1101 area to make the character swing the sword.

Figure 12:
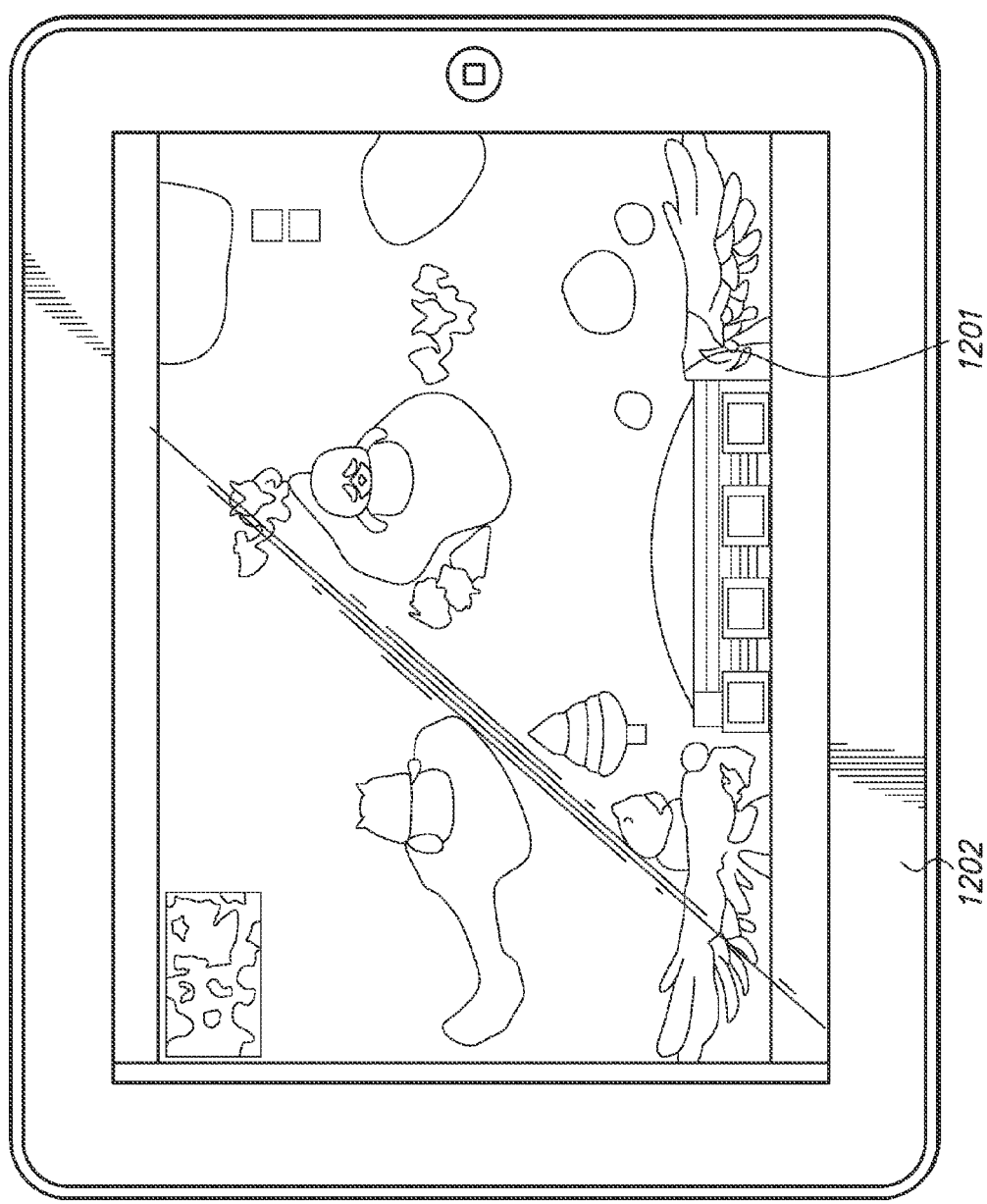
FIG. 12 shows how the screen would appear if the Touch Screen Game Control Peripheral (current invention) was being used.

In FIG. 12, it shows the screen 1201 in which the screen can be used if the Touch Screen Game Control Peripheral of current invention were being used. Notice there is no virtual directional pad or button.

Figure 13:
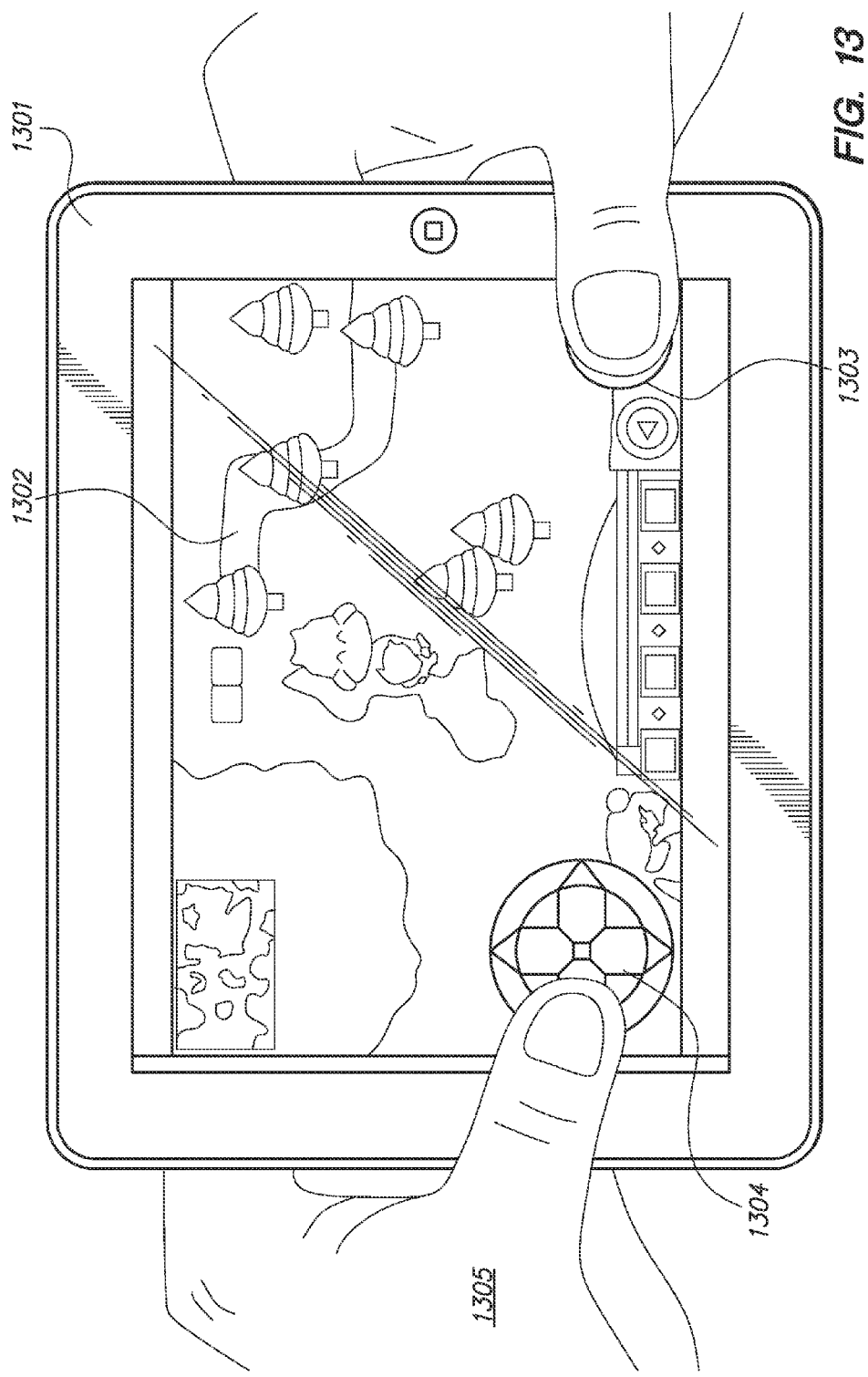
FIG. 13 shows how a user's hands would be holding the touch screen device and physically touching the virtual directional pad and button; (without using the subject invention)

In FIG. 13, the figure shows how a user's hands 1305 would be holding the touch screen device 1301 and physically touching the virtual directional pad 1304 and button 1303. Notice how it would also reduce the amount of real estate that is visible and available since the users' thumbs would have to be on the screen 1302.

Figure 14:
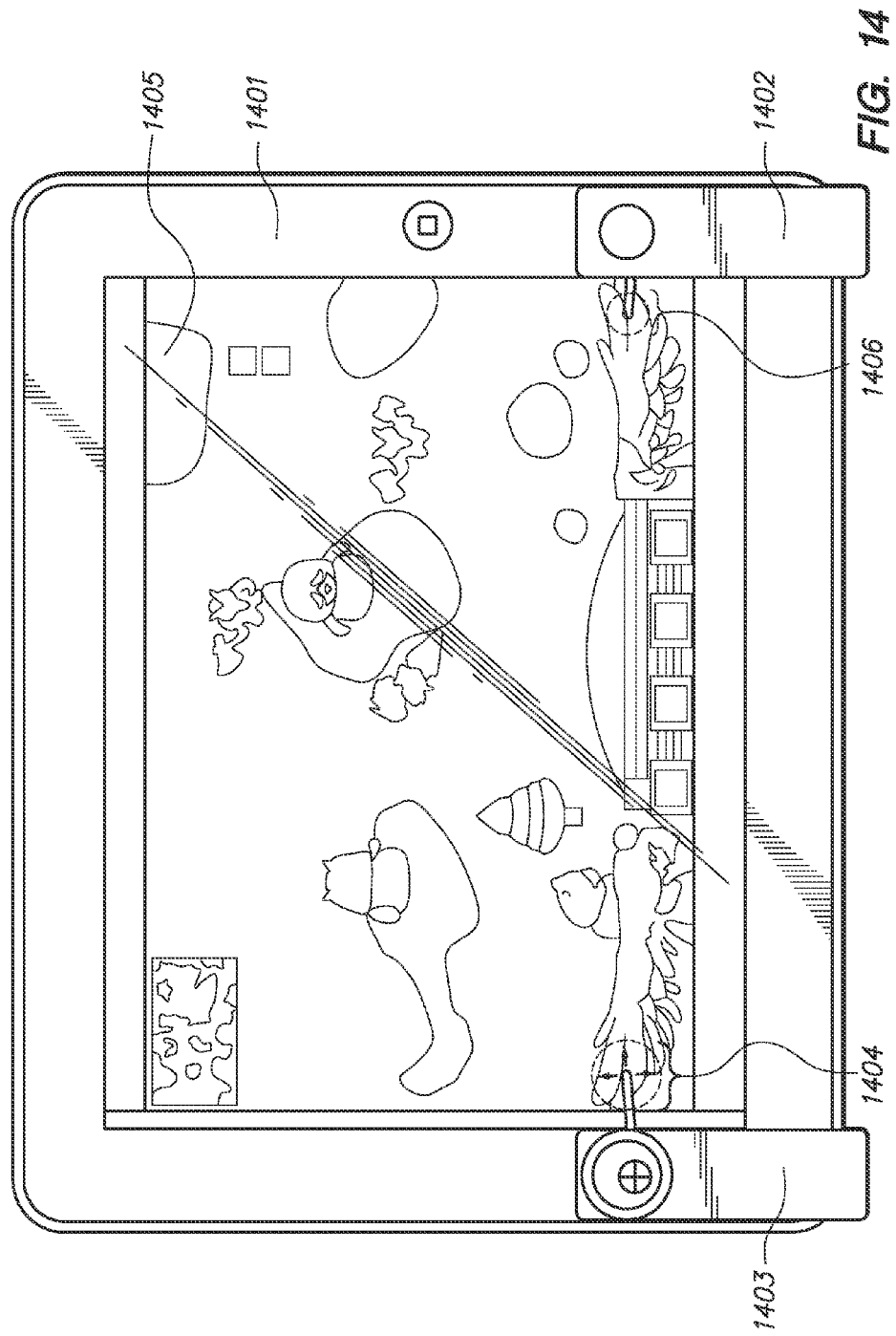
FIG. 14 shows the Touch Screen Game Control Emulator peripheral being attached to the touch screen device; to emulate the virtual controls.

In FIG. 14, the figure shows the Touch Screen Game Control Emulator peripheral of present invention attached to the touch screen device 1401. After going though the button setup and then the directional pad setup procedures, one can envision the area wherein the program will use to emulate the directional pad area 1404 and the button area 1406. This is the area that the peripheral arm would interact with. In this embodiment, there is no need for the game to display a virtual directional pad or button since the Touch Screen Game Control Emulator peripheral will be the dedicated device the user uses to interact with and emulate the game controls. Looking at the image area 1405, one can see that available real estate on the screen 1405 is increased since the users' thumbs do not need to physically touch the screen.

In FIG. 15, in another embodiment, the figure shows a custom Touch Screen Game Control Emulator created specifically for this device and game. Notice the user can play the game via the original way by physically touching the virtual directional pad 1505 and button 1506. Likewise, the user can attach the Touch Screen Game Control Emulator (directional pad emulator 1504 and button emulator 1503) specifically created for this game and device and use them to emulate game control, in this embodiment, the Touch Screen Game Control Emulator directly maps to the virtual directional pad 1505 and button 1506 that the user would interact with without the peripherals. In this embodiment, the advantage of this would be that the game would not have to implement the software component for integration to use the Touch Screen Game Control Emulator.

In yet another embodiment, in FIG. 16, the image shows what it would look like if a user is using the Touch Screen Game Control Emulator along with the software integration where the game allows for more viewable area on the display.

What is claimed is:

1. An input emulation apparatus for touch screen devices comprising:
   (a) an input device comprising a receptive component for user's hand input wherein said receptive component is a joystick and a contact component for contacting said touch screen device wherein said contact component is operatively linked to said receptive component such that said contact component contacts said touch screen device responding to said user's hand input to said receptive component;
   (b) an attachment device capable of attaching said input emulation apparatus to said touch screen device wherein said touch screen device has a display area wherein said attachment device attaches said input emulation apparatus to said touch screen device such that said contact component is free from occupying over said display area except when said receptive component is activated and said contact component is comprised of an arm extending from said input device wherein said arm touches said display area.

2. The input emulation apparatus of claim 1 wherein said attachment device is comprised of a body that secures the touch screen device to said input emulation apparatus, wherein said body is a sideways U-shaped body.

3. The input emulation apparatus of claim 1 wherein said receptive component and said contact component are made of conductive materials.

4. The conductive materials of claim 3 is selected from a group consisting of copper, silver, aluminum, graphite, and conductive polymers.

5. The input emulation apparatus of claim 1 wherein said contact component is comprised of an electrical charge generating material.

6. The electrical charge generating material of claim 5 is a magnet.

7. A method for input emulation for touch screen devices comprising: using an input emulation for the touch screen device to input command to said touch screen device wherein said input emulation for touch screen device is comprised of:
   (i) an input device comprising a receptive component for user's hand input wherein said receptive component is a joystick and a contact component for contacting said touch screen device wherein said contact component is operatively linked to said receptive component such that said contact component contacts said touch screen device responding to said user's hand input to said receptive component;
   (ii) an attachment device capable of attaching said input emulation apparatus to said touch screen device wherein said touch screen device has a display area wherein said attachment device attaches said input emulation apparatus to said touch screen device such that said contact component is free from occupying over said display area except when said receptive component is activated and said contact component is comprised of an arm extending from said input device wherein said arm touches said display area.

8. The input emulation apparatus of claim 7 wherein said attachment device is comprising of a body further comprising securing device wherein said securing secures said body to said input emulation apparatus, wherein said body is a sideways U-shaped body.

9. The input emulation apparatus of claim 7 wherein said receptive component and said contact component are made of conductive materials.

10. The conductive materials of claim 9 is selected from a group consisting of copper, silver, aluminum, graphite, and conductive polymers.

11. The input emulation apparatus of claim 7 wherein said contact component is comprised of electrical charge generating material.

12. The electrical charge generating material of claim 11 is a magnet.

* * * * *